United States Patent Office 3,451,462
Patented June 24, 1969

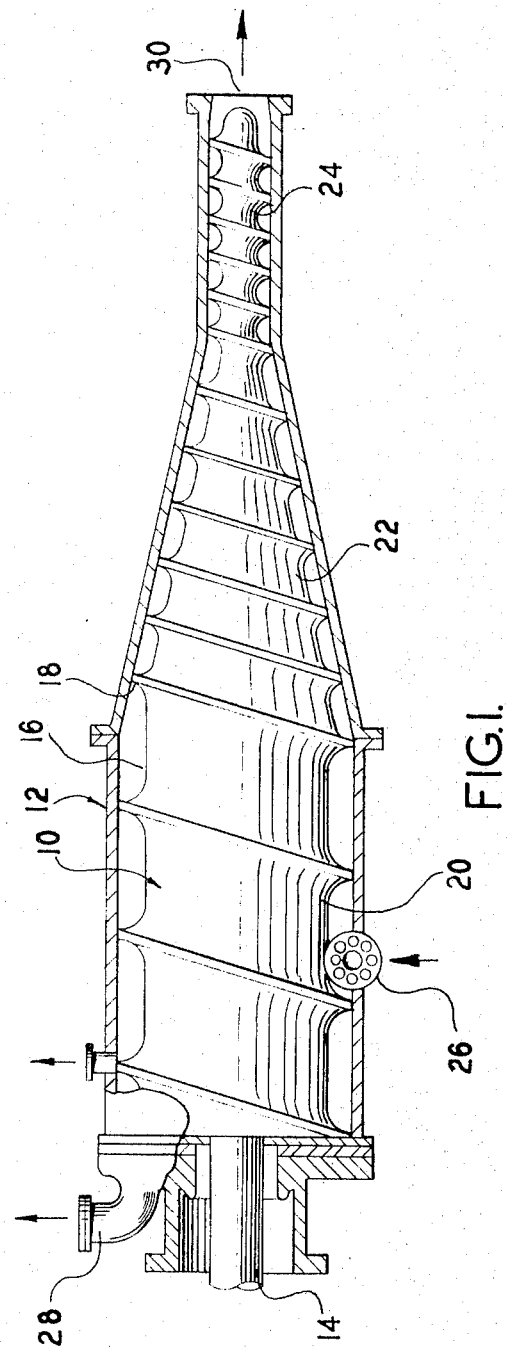

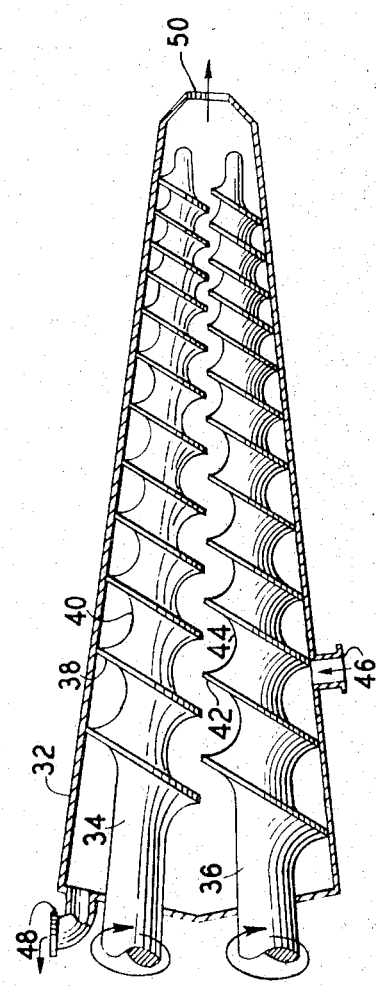

3,451,462
APPARATUS FOR DEVOLATILIZING LIQUID POLYMER COMPOSITIONS
Ted T. Szabo, Martinsville, and Felix Peter Klosek, Neshanic Station, N.J., assignors to Union Carbide Corporation, a corporation of New York
Filed Dec. 28, 1966, Ser. No. 605,319
Int. Cl. B01d 1/28; C08c 17/08
U.S. Cl. 159—2     4 Claims

ABSTRACT OF THE DISCLOSURE

Method and apparatus are provided for the devolatilization of polymer solutions employing tapered screw means mounted in a close fitting barrel; the barrel being maintained at reduced pressure. The solution is fed to the barrel, foams, the foam is compacted as it is moved along the tapered screw, vapors are drawn off and concentrated polymer is discharged from the apparatus.

---

This invention relates to method and apparatus for separating polymer from a liquid composition containing polymer and volatile constituents.

In the preparation of polymers, as in bulk and solution polymerization or by other conventional methods, considerable amounts of starting materials, such as unreacted monomer or solvent, remain admixed or entrained in the polymer product. This contamination of polymer is undesirable because of adverse effects on polymer properties well known to the art. A common method of separating the polymer from such fluid compositions is the devolatilization thereof. The composition is heated and introduced into a low pressure chamber to flash vaporize solvent and other volatiles causing foaming of the composition. However, a major difficulty with this method is that considerable vapor is entrapped in the foam and remains with the product. In addition, the cooling caused by vaporization so increases the viscosity of the product that it is difficult to remove the polymer from the flash chamber and, moreover at about 90% solids, the polymer solution tends to adhere to the chamber walls blocking the system.

The fluid composition can be further heated to offset the above problems; however, heating the composition to compensate for the cooling due to vaporization or to assist the flow-ability thereof can result in polymer degradation or other undesirable polymer formation.

Accordingly, it is an object of the present invention to provide method and apparatus for removing volatiles from a viscous fluid polymer composition to obtain a liquid polymer product of substantially greater than 90% solids and for readily delivering the viscous product to recovery or for further processing.

This and other objects are accomplished by the present invention which provides a devolatilization apparatus comprising helical screw means rotatably mounted in an extruder barrel in close clearance therewith, the screw means having a rearward end and a forward end and adapted to connect with rotating means therefor, a vapor vent adapted to connect with evacuating means situated in the barrel proximate the rearward end, an extruder discharge port situated in the barrel proximate the forward end and a feed solution inlet pot situated in the barrel between the vapor port and the discharge port, at least a portion of the screw means between the feed port and discharge port tapering toward the discharge end.

By the present invention, a method is provided for separating volatiles from a fluid composition containing polymer and volatile constituents comprising heating said composition at a given pressure to a temperature sufficient to vaporize volatiles thereof at a lower pressure or to a temperature sufficient to boil said composition at said given pressure, introducing said composition to the threaded screw means of an extruder, said screw means having thread grooves forward of the zone of introduction of progressively reduced size, maintaining said lower pressure in the chamber of said extruder to devolatilize said composition as it enters therein to form or further foam said composition and effect substantial release of the volatiles therefrom, rotating the screw means to advance the foam composition along said thread grooves to progressively compress and compact the foam composition and effect the further release of volatiles therefrom and pumping the devolatilized and concentrated polymer composition from said extruder.

The invention will become more apparent from the following detailed specification and drawings, in which:

FIG. 1 is a sectional elevation view of an apparatus suitable for carrying out the devolatilization process of the present invention and FIG. 2 is a sectional elevation view of another embodiment of an apparatus suitable for carrying out the process of the present invention.

Referring now to the drawings, extruder screw means 10 is rotatably mounted in extruder barrel 12 as illustrated in FIG. 1. The screw means 10 is driven by rotary drive means (not shown) connected to the screw means 10 by shaft 14. The extruder barrel 12 is maintained at reduced pressure by suitable evacuating means (not shown) connected to the extruder barrel by way of rear vapor vent 28. A liquid polymer composition (not shown) heated to a suitable devolatilization temperature is introduced to the extruder barrel 12 through inlet port 26 whereupon the composition flash devolatilizes, foams and is urged along the screw means 10 toward tapered section 22 for compression and further devolatilization. The extruder screw means 10 which has threads 18 separated by thread grooves 16 tapers from its rearward end toward the discharge section 24 as shown in FIG. 1. The tapered section 22 is characterized by progressively reduced thread diameter and correspondingly reduced groove or inner diameter. The extruder barrel 12 is sized to conform to to the shape of the screw means 10 and the screw is mounted in working proximity, i.e. in close clearance with the walls of the extruder barrel. The discharge section 24 and the surrounding barrel 12 extend at a relatively constant diameter to provide an ample pumping pressure for the polymer solution as it is conveyed toward the discharge port 30. The tapered section 22 preferably runs full along at least a part of its length to provide a buffer zone to dampen surging of the solution in the apparatus and provide relatively smooth product discharge. The devolatilized and concentrated polymer solution is discharged through discharge port 30. The barrel 12 as indicated above is contoured to the profile of the screw as shown in FIG. 1 to assure virtually complete product removal.

In another embodiment of the invention, a plurality of tapering screws can be employed as shown, for example, in FIG. 2. Twin tapering screws 34 and 36 are rotatably mounted in extruder barrel 32 in close proximity with one another. Screw 34 has threads 38 separated by thread grooves 40 and screw 36 has threads 42 separated by thread grooves 44. The extruder barrel 12, as shown in FIG. 2, is tapered toward the discharge end thereof to follow closely the profile of the screws 34 and 36 so that the threads 38 and 42 thereof sweep the inner surfaces of the barrel 12 substantially clean of polymer solution. Polymer feed solution is fed to the barrel 12 through inlet port 46 foamed, compressed and devolatilized as it is advanced along the tapering screws and is discharged at product discharge port 50. A vacuum pump (not shown) serves to maintain the barrel 12 at reduced pressure as well as drawoff vapors released from the solution being devolatilized by way of rear vent 48.

By the method of the present invention a liquid composition as dilute as 50% by weight polymer can be processed to substantially solvent-free polymer having less than 1% and frequently less than 0.05% by weight of residual solvent including monomer or other volatile therein. For example, polystyrene solution containing 50% by weight of the polymer in unreacted monomer can be processed to 99.9% by weight of the polymer or more.

The fluid polymer composition can be composed of virtually any polymeric material such as polystyrene, the polyolefins such as polyethylene and polypropylene, vinyl polymers and the like dissolved in a suitable solvent such as its monomer, or inert organic liquids such as benzene, toluene, heptane, acetone and the like.

The polymer composition can be fed to the devolatilizing apparatus of the present invention at varying rates depending on such factors as the nature of the feed materials, the feed temperature, pressure in the extruder barrel of the apparatus, r.p.m. of the screw or screws, size of the equipment and the like. The example appearing below serves as an illustration of a combination of such factors which can be readily determined by the skilled practitioner in accordance with process demands.

The fluid composition is fed to the apparatus of the invention or vapor-liquid separation zone at temperature sufficient to cause vigorous devolatilization thereof when the feed enters the extruder barrel but below the temperature at which the particular solution components degrade or are otherwise adversely affected. The solution can be maintained at a pressure sufficiently high to prevent boiling thereof in the feed lines by throttle valves, for example, mounted in the lines adjacent to the apparatus. However, the solution is preferably heated to boiling before being fed to the apparatus of the invention for devolatilization and concentration thereof. For example, the solution to be concentrated is passed through a heat exchanger, where it is boiled and discharged as a foamy mass into the apparatus of the invention, which is usually operated under reduced pressure. The vapors from the incoming boiling solution, joined by additional vapors generated by flashing and mechanical shearing of the solution in the apparatus then proceed in a helical path rearward along the flights of the screw toward the vapor vent of the apparatus. As the viscous polymer is conveyed by drag flow toward the discharge port (prior to densification), new surface is exposed for additional vaporization. This latter source of vapor, continues until the combined effects of back pressure and of the reduction in cross sectional area cause the flights to run full. Beyond this point there is substantially no further vapor release.

The pressure in the extruder barrel is maintained below the vapor pressure of the feed solution and preferably well below the feed pressure to provide a substantial pressure drop and flash vaporization of volatiles such as the solvent or solvents thereof, with resultant vigorous foaming of the solution. The temperature within the barrel is preferably sufficiently high to maintain the solution product in a liquid state as well as vaporize the solvent component. The operating temperature of the barrel is determined by diverse factors, for example, by its maintained pressure and the thermal properties of the feed solution which upon entering expands and cools.

Although the pressure in the extruder barrel varies depending upon the particular solvents or other volatiles being vaporized, it has been found that pressures in the range of from about 10 to about 760 mm. Hg or above are suitable; the lower end of the range being preferred particularly from 10 to 300 mm. Hg.

One or more vapor vents can be situated at any position along the extruder barrel including near the tapering portion of the screw, if desired, for volatile release. However, it is preferable that the vapor vent (or vents) be rear vents, i.e. be situated in the apparatus upstream from the inlet port of the polymer feed solution, in order to minimize loss of polymer out the vent. Thus the entering polymer solution is immediately conveyed downstream away from the rear vent by the screw or screws while the released vapors can flow upstream or countercurrent to the polymer in a helical or other rearward path and out the rear vent under the influence of a vacuum pump.

As indicated, a conventional vacuum pump or other suitable evacuating means, connected, for example, to the apparatus of the invention by way of the vapor vent above, can be conveniently employed in the present invention. A condenser can be connected to the vacuum pump, e.g., for recovery of the stripped volatiles. However, when a low boiling solution is fed to the chamber, for example, under high temperature and pressure, evacuating means can appropriately be dispensed with in accordance with process requirements.

The extruder screw and barrel are preferably made of rigid material such as metal for example stainless steel or other suitable metal. The threads of the screw can take various shapes as desired and can vary angular to rounded. The threads can be of uniform distances from one another or different distances for example they can become more closely spaced going from the rearward to the extrusion end of the screw. The screw moreover can have one tapering zone or several as suitable for the given application. It is desirable that at least the last such tapered zone of the screw be in close contact with the extruder barrel and taper from rearward to forward end of the screw.

Where more than one screw is employed in the extruder barrel, the screws can intermesh or be mounted in close proximity without intermeshing. Moreover the screws can co-rotate or counter rotate as desired. Preferably the screws co-rotate and closely intermesh, so that the threads thereof wipe the surfaces of each other as well as the barrel surfaces.

The screw or screws can be rotated at any suitable speed up to about 300 r.p.m. or more in accordance with process and mechanical requirements.

The following example is intended as an illustration of the invention and should not be construed in limitation thereof.

EXAMPLE

A solution of polystyrene in its monomer was devolatilized in an apparatus similar to that shown in FIG. 1. The screw was 27 inches long having a 12 inch input section connected to a 12 inch tapering section and a 3 inch discharge section, extending from the smaller end of the tapering section. The screw had a crest diameter of 7.5 inches and a root diameter of about 3.7 inches at the input section which tapered to a crest diameter of about 1.5 inches and a root diameter of 1.0 inch at the above 3 inch section. The screw threads had a thickness of ⅛-inch near the crest thereof tapering to 2 inches thick at the base thereof. The thread separation varied from 3 inches at the larger end to 1 inch at the smaller end thereof. Samples were run as indicated in the following table.

TABLE

| Run | Feed rate, lbs./hr. | r.p.m. | Extruder barrel | | Percent polystyrene in feed | Percent polystyrene in product | Product rate, lbs./hr. |
| --- | --- | --- | --- | --- | --- | --- | --- |
| | | | Feed Temperature, °C. | Pressure, mm. Hg | | | |
| 1 | 216.0 | 66 | 190 | 100 | 53.5 | 90.7 | 119.0 |
| 2 | 106.0 | 88 | 194 | 100 | 67.8 | 98.4 | 69.2 |
| 3 | 43.5 | 84 | 193 | 100 | 63.7 | 99.2 | 29.4 |

Thus it is apparent that the process of the invention serves to provide substantially volatile-free polymer. The percent polymer in the product can be raised by adjustments of the tabulated variables such as lowering the barrel pressure or increasing the temperature of the feed or other means such as increasing the size of the apparatus components, as can be readily determined by the skilled practitioner for a given polymer composition, to produce a product of up to 99.9% polymer or more. Moreover, the polymer product can, where suitable, be reprocessed i.e., subjected to flashing and compression two or more times.

It will be recognized that the apparatus of the present invention can be used singly in devolatilization systems or with one or more other such tapering screw devolatilizers in series as suitable for the desired application. Moreover, the apparatus of the present invention can be used in connection with a flash chamber which feeds its product into the present apparatus and furthermore the extruder screw of the present invention can also be employed with an extruder die of various shapes and size so that the effluent having been devolatilized may immediately be extruded into a desired form. In addition, the devolatilizer of the present invention can be linked in series with another concentrator including a conventional milling stage to obtain virtually pure polymer, such as, for example, a twin screw mill well known in the art.

What is claimed is:

1. Apparatus for the continuous devolatilization of a foamable, viscous, volatile-containing solution comprising: a body member having rotatably mounted therein, in close clearance therewith, horizontal helical screw means having downstream and upstream ends and adapted to connect with rotating drive means; solution inlet means communicating with an inlet region of relatively low pressure defined between the inner walls of said body member and the helical screw means near its upstream end; a solution compacting region downstream of said inlet region defined between the inner walls of said body member and said helical screw means, said helical screw means in said compacting region being tapered and having a pitch less than that of said screw means in said inlet region; product discharge means positioned in said body member proximate the downstream end of said screw means; and vapor vent means positioned in said body member upstream of said solution inlet means; said close clearance between said body member and said screw means being such as to permit the continuous passage of released volatiles in counter-current direction through the solution and clearance, while at the same time preventing the upstream flow of said solution to said vapor vent means.

2. Apparatus in accordance with claim 1, wherein said screw means comprises a single helical screw.

3. Apparatus for the continuous devolatilization of a foamable, viscous, volatile-containing solution comprising: screw means rotatably mounted in a body member in close clearance therewith, said screw means having an upstream end and a downstream end and adapted to connect with driving means therefor; vapor vent means adapted to connect with evacuating means and positioned in said body member proximate said upstream end; product discharge means positioned in said body member proximate said downstream end; and solution inlet means positioned in said body member between said vapor vent means and said product discharge means; at least a portion of said screw means between said inlet means and said product discharge means tapering toward said downstream end; said screw means comprising two helical screws positioned in close proximity with one another, and mounted to co-rotate.

4. Apparatus in accordance with claim 3, wherein said helical screws have the same pitch variations and intermesh during co-rotation at the same angular velocity.

References Cited

UNITED STATES PATENTS

| | | |
| --- | --- | --- |
| 1,156,096 | 10/1915 | Price. |
| 2,458,068 | 1/1949 | Fuller _____ 100—104 |
| 2,572,063 | 10/1951 | Skipper _____ 25—14 |
| 2,617,167 | 11/1952 | Johnson _____ 264—102 |
| 3,035,306 | 5/1962 | Rossiter. |
| 3,067,462 | 12/1962 | Kullgren _____ 18—12 |
| 3,113,843 | 12/1963 | Wen Han Li _____ 23—285 |
| 3,211,209 | 10/1965 | Lahnen et al. |
| 3,361,537 | 1/1968 | Ferrante _____ 23—283 |

WILBUR L. BASCOMB, JR., *Primary Examiner.*

J. SOFER, *Assistant Examiner.*

U.S. Cl. X.R.

18—12; 264—87